US011933103B2

(12) United States Patent
Liang

(10) Patent No.: US 11,933,103 B2
(45) **Date of Patent: *Mar. 19, 2024**

(54) CONTROL DEVICE FOR MOTORIZED WINDOW BLIND

(71) Applicant: CHING FENG HOME FASHIONS CO., LTD., Changhua County (TW)

(72) Inventor: Wen Ying Liang, Changhua County (TW)

(73) Assignee: CHING FENG HOME FASHIONS CO., LTD., Changhua County (TW)

( * ) Notice: Subject to any disclaimer, the term of this patent is extended or adjusted under 35 U.S.C. 154(b) by 31 days.

This patent is subject to a terminal disclaimer.

(21) Appl. No.: 17/039,819

(22) Filed: Sep. 30, 2020

(65) Prior Publication Data

US 2022/0065033 A1 Mar. 3, 2022

(30) Foreign Application Priority Data

Sep. 3, 2020 (TW) ................................ 109130139

(51) Int. Cl.
*E06B 9/322* (2006.01)
*E06B 9/68* (2006.01)

(52) U.S. Cl.
CPC ................ *E06B 9/322* (2013.01); *E06B 9/68* (2013.01); *E06B 2009/6845* (2013.01)

(58) Field of Classification Search
CPC ............... E06B 2009/3222; E06B 9/70; E06B 2009/6809; E06B 2009/6818; E06B 9/30; E06B 9/26; E06B 9/32; E06B 9/322; E06B 9/68; E06B 2009/6845
See application file for complete search history.

(56) References Cited

U.S. PATENT DOCUMENTS

| | | | | |
|---|---|---|---|---|
| 10,113,359 | B1 † | 10/2018 | Chen | |
| 2005/0072635 | A1 * | 4/2005 | Toti | E06B 9/262 185/39 |
| 2006/0162874 | A1 † | 7/2006 | Lin | |
| 2016/0258213 | A1 * | 9/2016 | Cavarec | E06B 9/68 |

(Continued)

FOREIGN PATENT DOCUMENTS

| | | | | |
|---|---|---|---|---|
| EP | 1188896 | A2 | † | 3/2002 |
| WO | 02/41740 | A1 | † | 5/2002 |

*Primary Examiner* — Abe Massad
*Assistant Examiner* — John W Hanes, Jr.
(74) *Attorney, Agent, or Firm* — Che-Yang Chen; Law Office of Michael Chen

(57) ABSTRACT

A motorized window blind includes a top rail, a bottom rail, a plurality of slats assembled between the top rail and the bottom rail, and a control device received in the bottom rail so as to control movement of the slats. The control device includes a transmission unit, a motor, a first cord, a second cord and a power supply. The power supply provides electric power to the motor which is connected to the transmission unit. The first and second cords are respectively connected to the transmission unit, and extend through the slats, and are connected to the top rail. The transmission unit is driven by the motor to lift and lower the slats. The control device includes a detection unit and an angle detection member. The slats are lowered when the detection unit detects the power supply is low. The angle detection member angularly controls the salts status.

4 Claims, 7 Drawing Sheets

(56) References Cited

U.S. PATENT DOCUMENTS

| | | | | |
|---|---|---|---|---|
| 2017/0211321 | A1 * | 7/2017 | Chen | E06B 9/322 |
| 2017/0260806 | A1 * | 9/2017 | Adams | H04W 52/0245 |
| 2018/0202224 | A1 † | 7/2018 | Kumar | |
| 2018/0230739 | A1 * | 8/2018 | Huang | F16H 19/06 |
| 2019/0119978 | A1 * | 4/2019 | Hall | H04L 12/2818 |

* cited by examiner
† cited by third party

CONTROL DEVICE FOR MOTORIZED WINDOW BLIND

BACKGROUND OF THE INVENTION

1. Fields of the Invention

The present invention relates to a motorized window blind, and more particularly, to a control device for a window blind so as to lower the slats when the power supply is low. The slats can be controlled by wireless controller.

2. Descriptions of Related Art

The conventional smart window blind is cooperated with an electronic device to be activated. For example, the smart widow blind is lifted when a pre-set time is set to let the users be acknowledged when it is time to get up. This type of feature provides the users many convenient ways to manage their life schedule.

However, most of the motorized window blinds are powered by city power, in other words, when the power cannot be provided, the motorized blinds cannot function. Besides, the control device of all of the conventional smart window blinds is installed in the top rail, this makes the top rail be heavy and difficult to be installed. The blinds cannot be lowered when there is a power failure issue, this may cause privacy issues.

The present invention intends to provide a control device for a window blind to eliminate shortcomings mentioned above.

SUMMARY OF THE INVENTION

The present invention relates to a motorized window blind and comprises a top rail, a bottom rail, a plurality of slats assembled between the top rail and the bottom rail, and a control device received in the bottom rail. The control device includes a transmission unit, a motor, a first cord, a second cord and a power supply. The power supply provides electric power to the motor which is connected to the transmission unit. A first end of each of the first and second cords is connected to the transmission unit, and a second end of each of the first and second cords extends through the slats and is connected to the top rail. The transmission unit is driven by the motor to lift and lower the slats.

Preferably, the control device includes a detection unit which detects voltages of the power supply. When the voltage of the power supply is lower than a pre-set value, the detection unit sends a signal to the motor to lower the slats, so that the users is convenient to replace the battery of the power supply.

Preferably, the power supply includes at least one battery.

Preferably, the control device includes an angle detection member which is located in the motor. The angle detection member detects rotational position and speed of the motor to angularly control the slats.

Preferably, the motor includes a wireless receiver which receives signals from a mobile device or a controller to control the slats.

Preferably, the transmission unit includes a box, a passive member, a first member and a second member. The passive member, the first member and the second member are received in the box. The passive member includes a bevel gear and a main gear which is co-axially formed with the bevel gear. The motor includes a shaft which is connected with a driving gear. The driving gear is engaged with the bevel gear so as to drive the passive member. The main gear is located beneath the bevel gear. The first member includes at least one first gear and a first spool. The second member includes at least one second gear and a second spool. At least one first gear of the first member is engaged with the main gear of the passive member so as to rotate the first member in a rotational direction opposite to a rotational direction of the passive member. The first cord is wound to the first spool and extends through the slats, and is connected to the top rail. The second gear of the second member is engaged with the first gear of the first member. The first member rotates the second member to rotate in a rotational direction opposite to a rotational direction of the first member. The second cord is wound to the second spool and extends through the slats, and is connected to the top rail.

The primary object of the present invention is to provide a motorized window blind, wherein the control device is received in the bottom rail so that the maintenance to the control device is convenient for the users. The weight of the top rail is reduced and is easily installed.

Another object of the present invention is to provide a motorized window blind, wherein the control device is powered by a power supply including batteries which can be replaced easily.

Yet another object of the present invention is to provide a motorized window blind, wherein the slats of the blind are automatically lowered when the power supply is low.

Yet another object of the present invention is to provide a motorized window blind, wherein the control device includes an angle detection member which is located in the motor. The angle detection member detects rotational position and speed of the motor to angularly control the slats.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Referring to FIGS. 1 to 8, the motorized window blind of the present invention comprises a top rail 1, a bottom rail 2, a plurality of slats 3 assembled between the top rail 1 and the bottom rail 2, and a control device 4 received in the bottom rail 2. The slats 3 are controlled by the control device 4 to be lifted or lowered. The slats 3 can also be different types and shapes, such as honeycombs or Roman shades.

The top rail 1 can be a U-shaped rail which is installed to top of a window, and can be easily installed because no control device 4 received therein.

Figure 1:
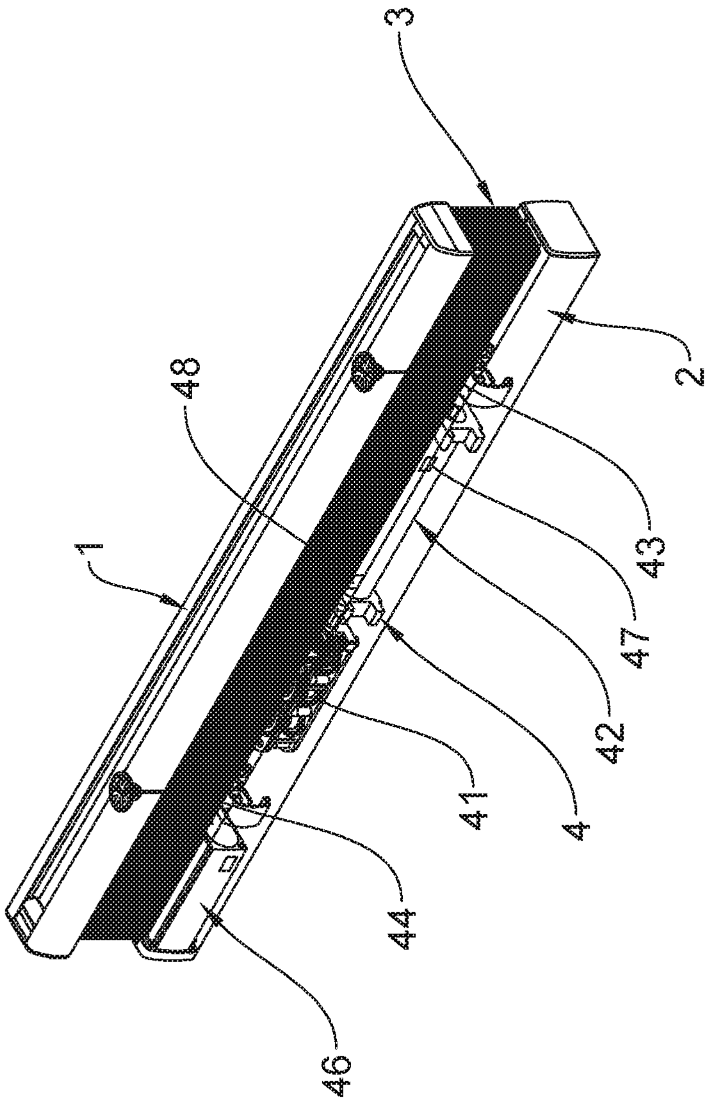
FIG. 1 is a perspective view to show the motorized window blind of the present invention.
Figure 2:
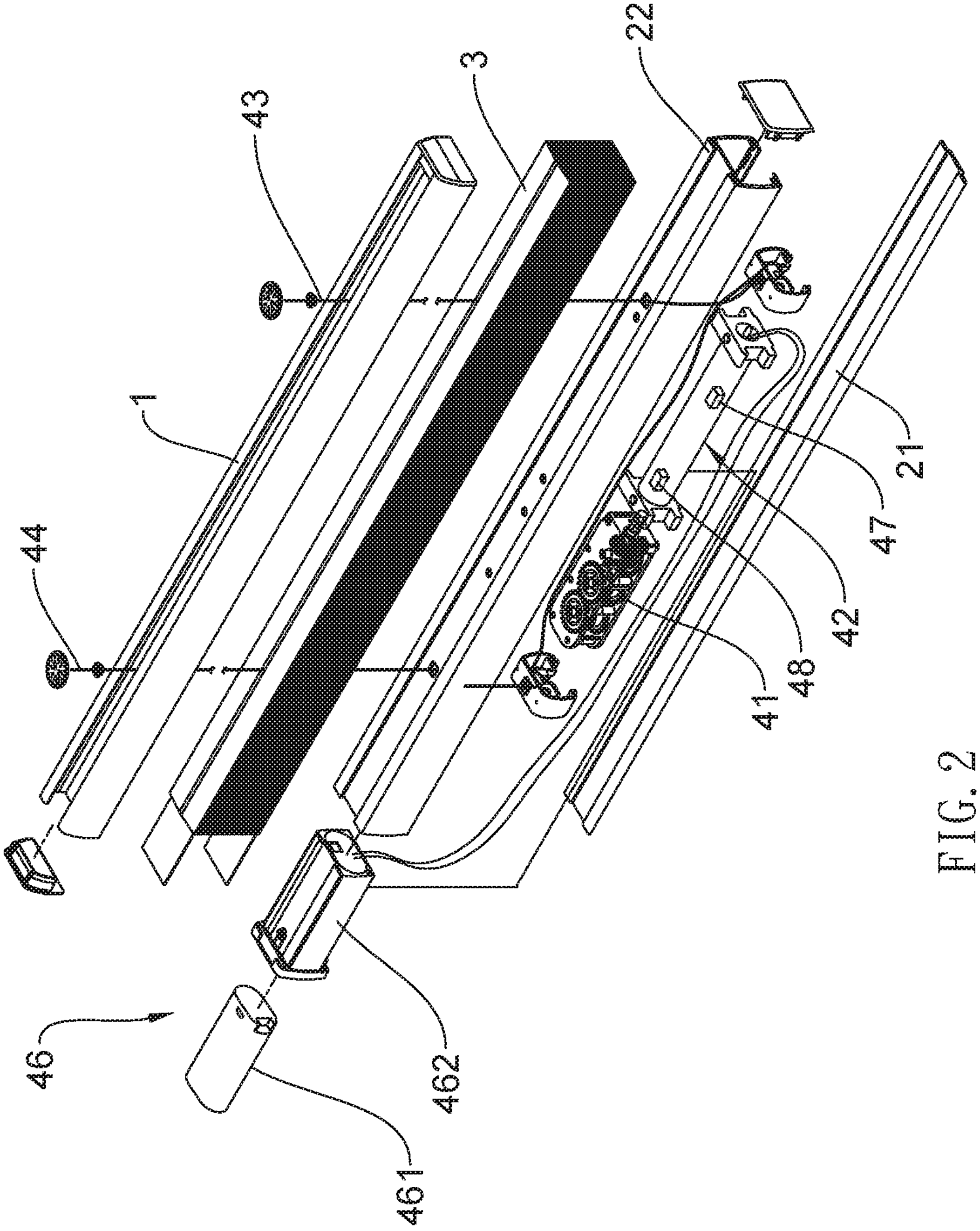
FIG. 2 is an exploded view of the motorized window blind of the present invention.
Figure 3:
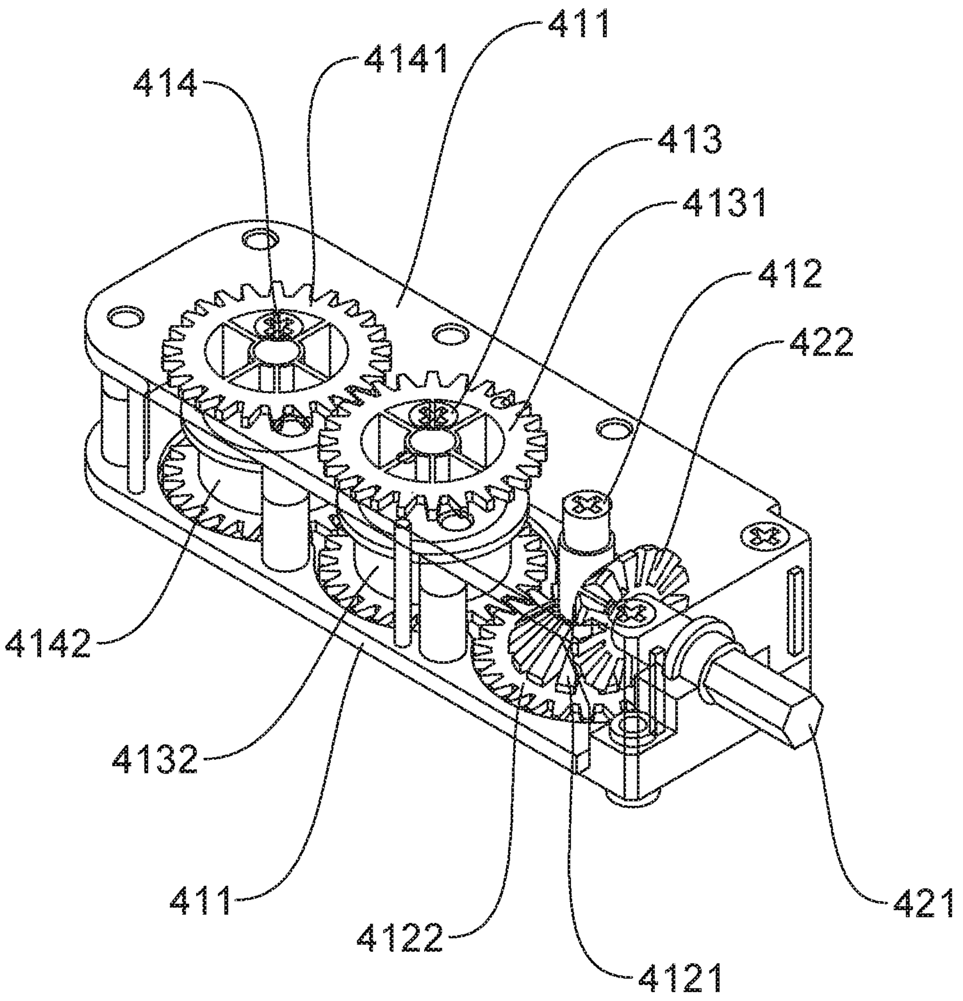
FIG. 3 is a perspective view to show the transmission unit of the motorized window blind of the present invention.

As shown in FIGS. 1 and 2, the bottom rail 2 includes a housing 22 and a bottom plate 21. The control device 4 is received in the housing 22 and the bottom plate 21 is connected to the housing 22 to hide the control device 4.

The control device 4 received in the bottom rail 2 includes a transmission unit 41, a motor 42, a first cord 43, a second cord 44, and a power supply 46. The power supply 46 provides power to the motor 42, and the motor 42 is connected to the transmission unit 41. A first end of each of the first and second cords 43, 44 is connected to the transmission unit 41. A second end of each of the first and second cords 43, 44 extends through the slats 3 and is connected to the top rail 1. The transmission unit 41 is driven by the motor 42 to lift and lower the slats 3.

As shown in FIGS. 3 to 6, the transmission unit 41 includes a passive member 412, a first member 413 and a second member 414. The passive member 412, the first member 413 and the second member 414 are received in a box 411. The passive member 412 includes a bevel gear 4121 and a main gear 4122 which is co-axially formed with the bevel gear 4121. The motor 412 includes a shaft 421 which is connected with a driving gear 422. The driving gear 422 is engaged with the bevel gear 4121 so as to drive the passive member 412. The main gear 4122 is located beneath the bevel gear 4121. The first member 413 includes at least one first gear 4131 and a first spool 4132. The second member 414 includes at least one second gear 4141 and a second spool 4142. At least one first gear 4131 of the first member 413 is engaged with the main gear 4122 of the passive member 412 so as to rotate the first member 413 in a rotational direction opposite to a rotational direction of the passive member 412. The first cord 43 is wound to the first spool 4132 and extends through the slats 3 and is connected to the top rail 1. The second gear 4141 of the second member 414 is engaged with the first gear 4131 of the first member 413. The first member 413 rotates the second member 414 to rotate in a rotational direction opposite to a rotational direction of the first member 413. The second cord 44 is wound to the second spool 4142 and extends through the slats 3 and is connected to the top rail 1. The motor 42 includes a wireless receiver which receives signals from a mobile device or a controller to drive the motor 42 to control the slats 3.

Figure 7:
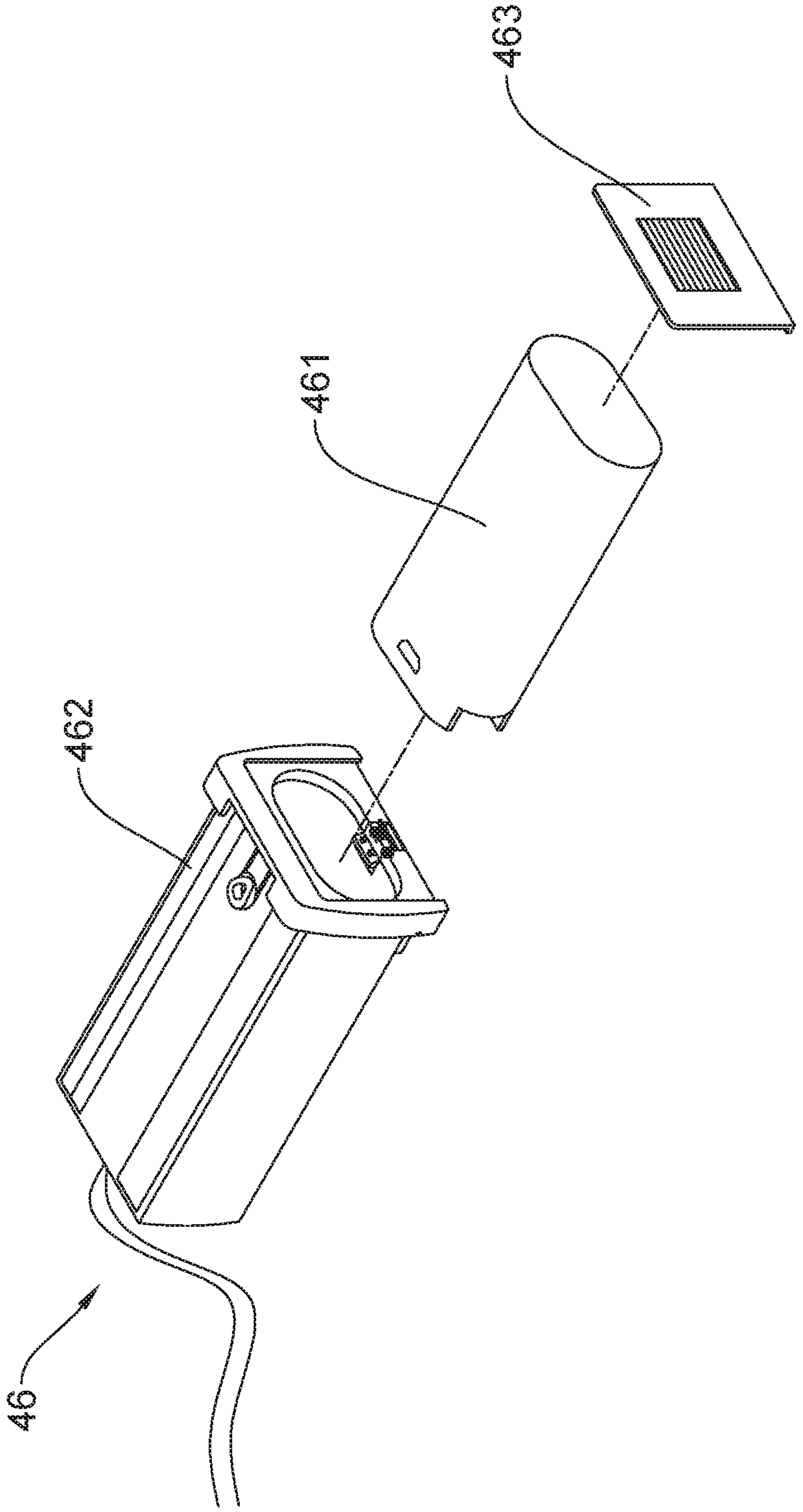
FIG. 7 is an exploded view to show the power supply of the motorized window blind of the present invention.

As shown in FIG. 7, the power supply 46 includes a chargeable battery 461 and a battery box 462 in which the chargeable battery 461 is received. A cap 463 is connected to one end of the battery box 462 to seal the battery box 462. The sealed battery box 462 protect the chargeable battery 461 and prevents the connections of the power supply 46 from being loosened during frequent operation of the slats 3.

Figure 8:
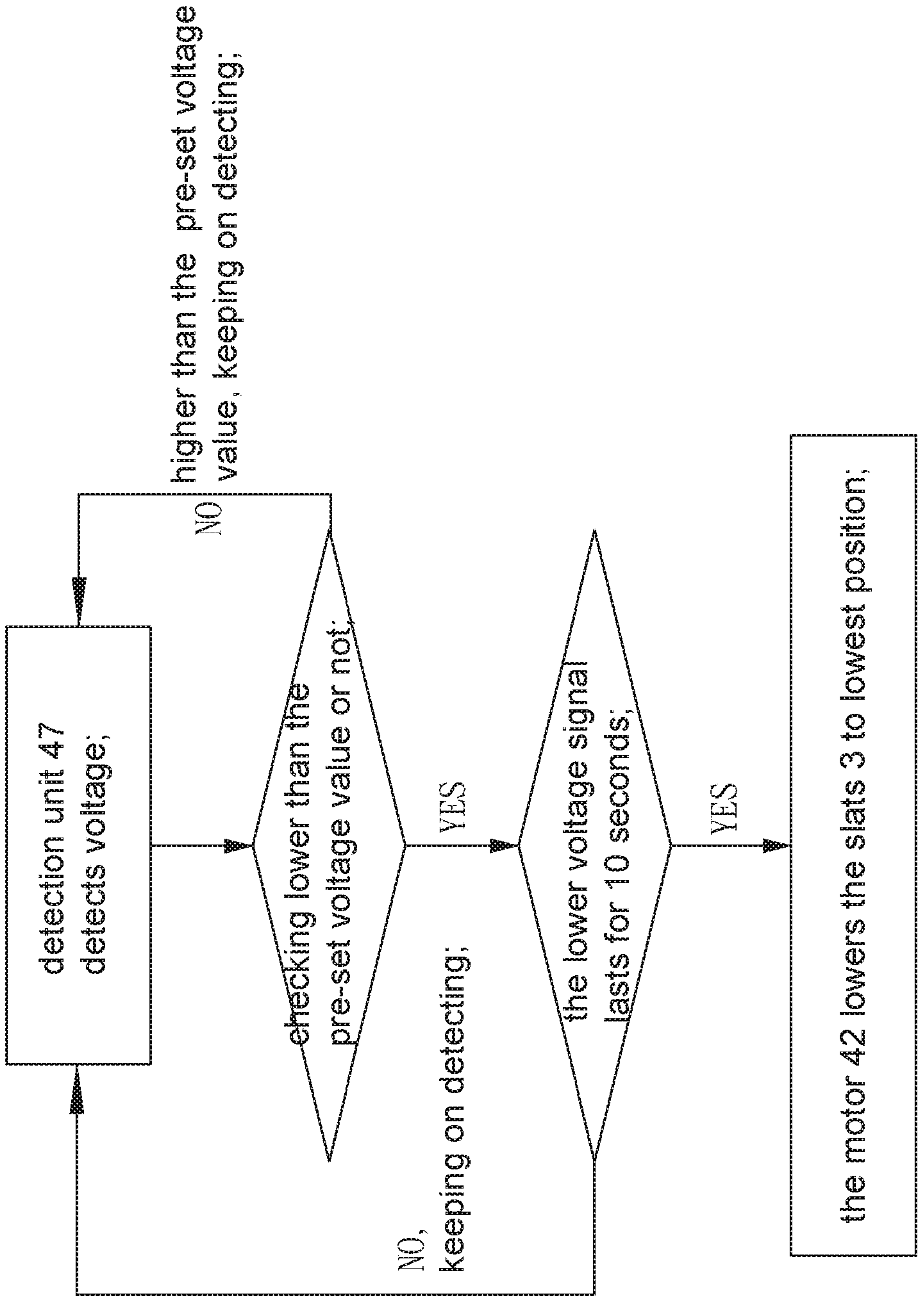
FIG. 8 illustrates operational steps of the detection unit of the motorized window blind of the present invention.

As shown in FIGS. 1, 2 and 8, the control device 4 includes a detection unit 47 which detects voltages of the power supply 6. When the voltage of the power supply 46 is lower than a pre-set voltage value, the detection unit 47 sends a signal to the motor 42 to lower the slats 3. Specifically, assume the work voltage of the motor 42 is DC 6 to 8.4V (voltage). When the voltage of the power supply 46 is lower than DC6.2V, the detection unit 47 detects the lower voltage, and the lower voltage signal lasts for 10 seconds, the detection unit 47 sends a signal to the motor 42 to lower the slats 3 to the lowest position. That is to say, the window will be completely covered by the blind to provide privacy of the users. The users are easily access the bottom rail 2 to replace the rechargeable battery 461.

Figure 4:
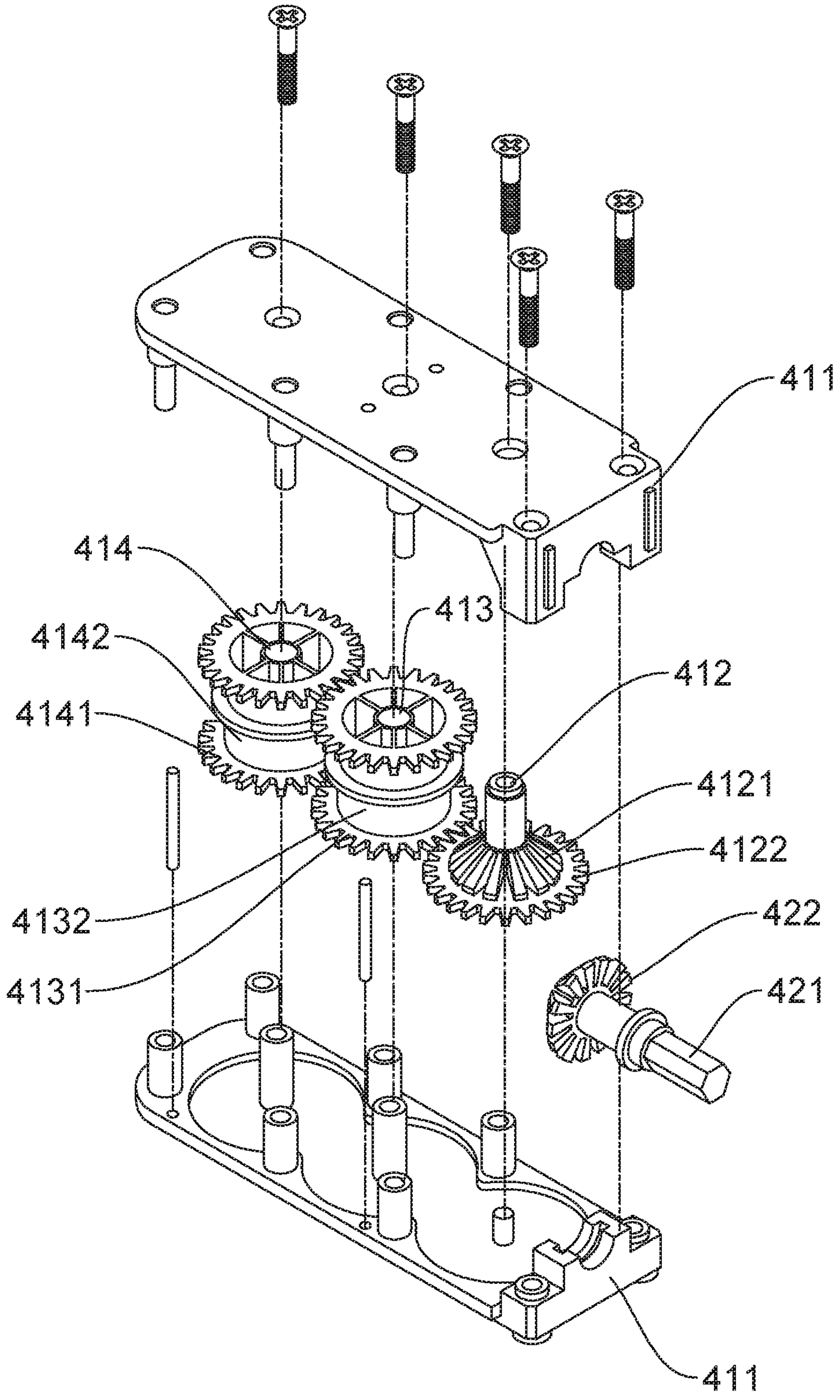
FIG. 4 is an exploded view to show the transmission unit of the motorized window blind of the present invention.
Figure 5:
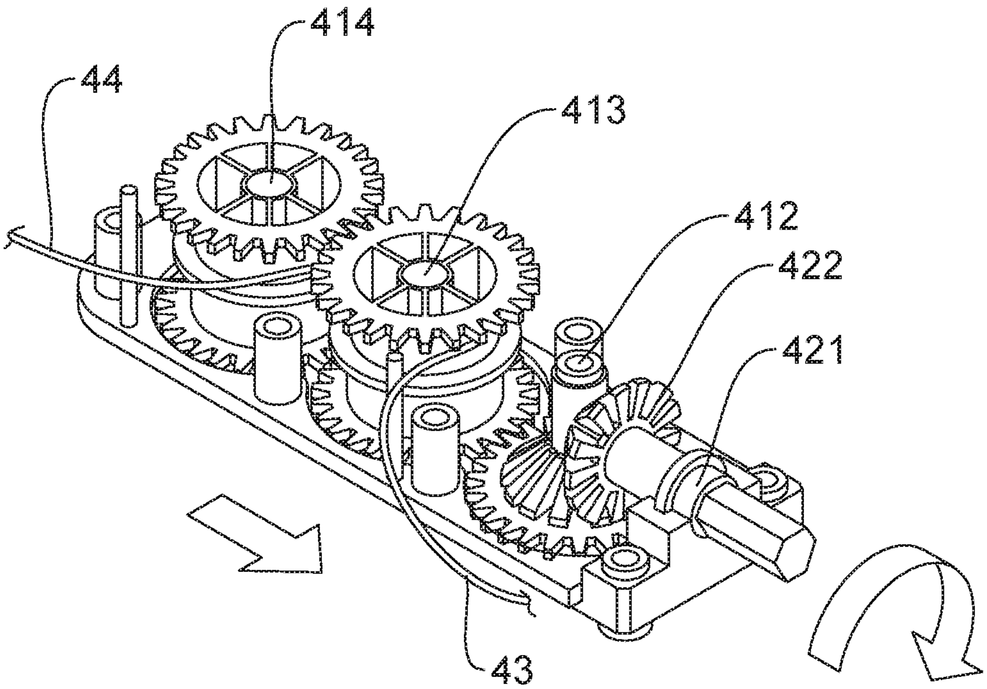
FIG. 5 shows an operational status of the transmission unit of the motorized window blind of the present invention, and the blind is lowered.
Figure 6:
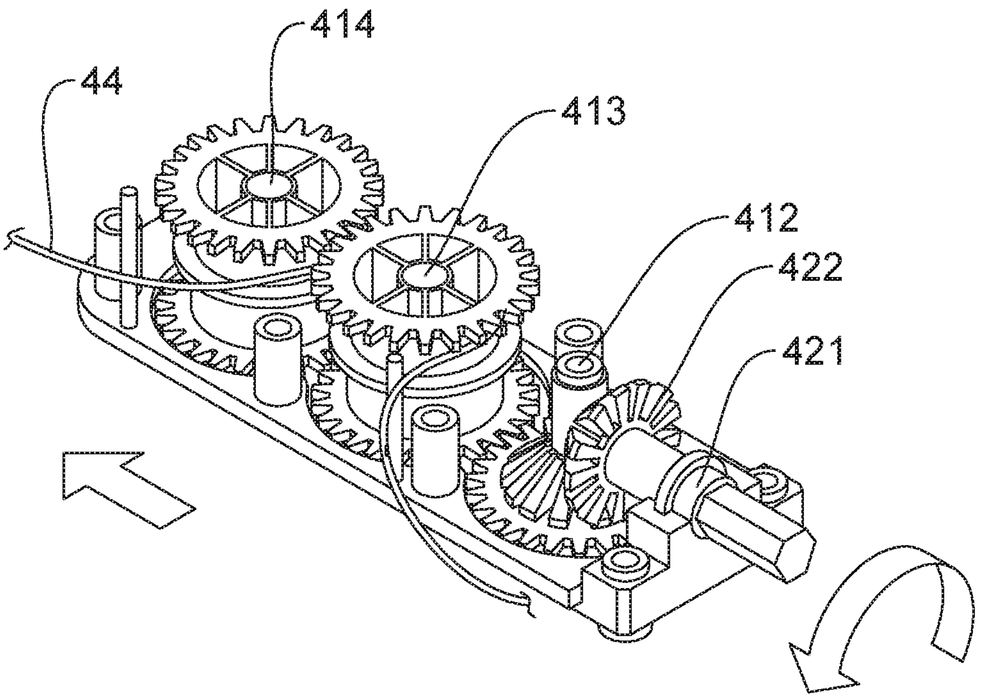
FIG. 6 shows another operational status of the transmission unit of the motorized window blind of the present invention, and the blind is lifted.

As shown in FIGS. 4 to 6, the control device 4 includes an angle detection member 48 which is located in the motor 42. The angle detection member 48 detects rotational position and speed of the motor 42 to angularly control the slats 3. That is to say, the tilt state of the slats 3 can be precisely controlled by the angle detection member 48 so as to occlude the window opening. A mobile device or a controller is used to control the motor 42 to control the slats 3.

While we have shown and described the embodiment in accordance with the present invention, it should be clear to those skilled in the art that further embodiments may be made without departing from the scope of the present invention.

What is claimed is:

1. A motorized window blind comprising:

a top rail;

a bottom rail;

a plurality of slats assembled between the top rail and the bottom rail, and a control device received in the bottom rail and including a transmission unit, a motor, a first cord, a second cord and a power supply, the power supply powering the motor, the motor connected to the transmission unit, a first end of each of the first and second cords connected to the transmission unit, a second end of each of the first and second cords extending through the slats and connected to the top rail, the transmission unit being driven by the motor to lift and lower the slats, the transmission unit including a box, a passive member, a first member and a second member, the passive member, the first member and the second member received in the box, the passive member including a bevel gear and a main gear which is co-axially formed with the bevel gear, the motor including a shaft which is connected with a driving gear, the driving gear engaged with the bevel gear so as to drive the passive member, the main gear located beneath the bevel gear, the first member including at least one first gear and a first spool, the second member including at least one second gear and a second spool, the at least one first gear of the first member engaged with the main gear of the passive member so as to rotate the first member in a rotational direction opposite to a rotational direction of the passive member, the first cord wound to the first spool and extending through the slats and connected to the top rail, the at least one second gear of the second member engaged with the at least one first gear of the first member, the first member rotating the second member to rotate in a rotational direction opposite to a rotational direction of the first member, the second cord wound to the second spool and extending through the slats and connected to the top rail, the control device including an angle detection member which is located in the motor, the angle detection member detecting rotational position and speed of the motor, the angle detection member of the control device controlling tilt state of the slats and angularly controlling the slats for occluding a window opening.

2. The motorized window blind as claimed in claim 1, wherein the control device includes a detection unit which detects voltages of the power supply, when the voltage of the power supply is lower than a pre-set value, the detection unit sends a signal to the motor to lower the slats.

3. The motorized window blind as claimed in claim 1, wherein the power supply includes at least one battery.

4. The motorized window blind as claimed in claim 1, wherein the motor includes a wireless receiver which is adapted to receive signals from a mobile device or a controller to control the slats.

* * * * *